W. W. McCORD, G. F. CLARK & P. M. HALL.
SEALING COMPOSITION FOR VEHICLE TIRES.
APPLICATION FILED DEC. 15, 1908.
918,189.
Patented Apr. 13, 1909.
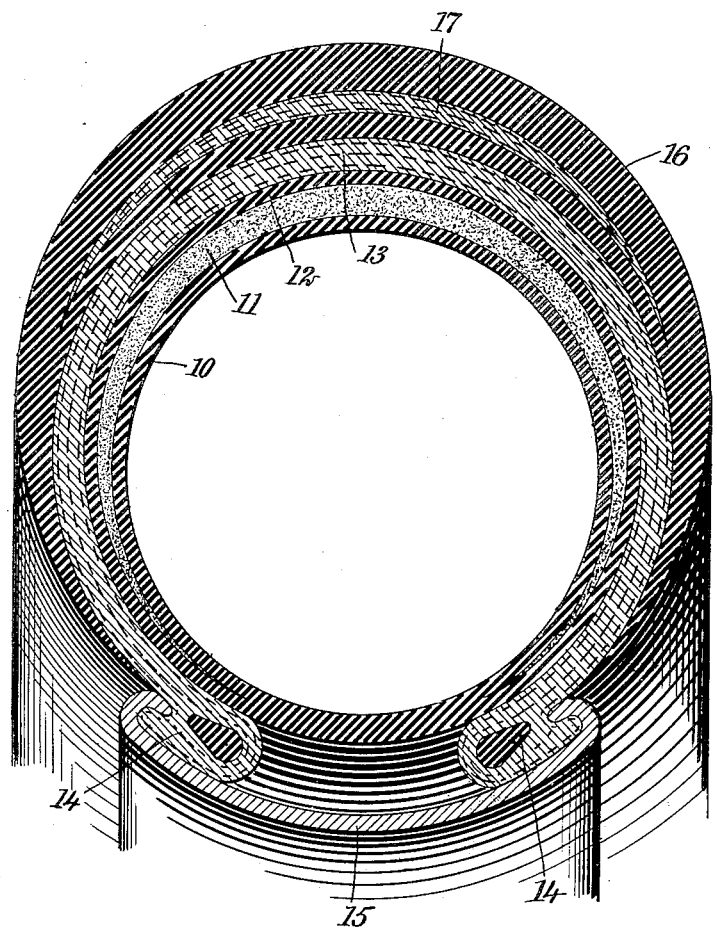
WITNESSES
INVENTORS
William W. McCord
George F. Clark
Presley M. Hall
BY Munn & Co
ATTORNEYS

UNITED STATES PATENT OFFICE.

WILLIAM W. McCORD, GEORGE F. CLARK, AND PRESLEY M. HALL, OF SEATTLE, WASHINGTON.

SEALING COMPOSITION FOR VEHICLE-TIRES.

No. 918,189.     Specification of Letters Patent.     Patented April 13, 1909.

Application filed December 15, 1908. Serial No. 467,681.

*To all whom it may concern:*

Be it known that we, WILLIAM W. MC-CORD, GEORGE F. CLARK, and PRESLEY M. HALL, citizens of the United States, and residents of Seattle, in the county of King and State of Washington, have invented a new and Improved Sealing Composition for Vehicle-Tires, of which the following is a full, clear, and exact description.

This invention relates to certain improvements in pneumatic vehicle tires, and more particularly to a fluid or plastic substance, so arranged in the tire that in case of a puncture, said substance will immediately fill the aperture and prevent the escape of air. The pneumatic tire is formed of a plurality of layers and intermediate two of these layers there is inserted our improved composition which has such a consistency that the inner and outer layers of the wall normally retain the same relationship to each other, but in case of a puncture through the walls, the plastic material will fill the aperture. The layer of plastic material preferably does not extend entirely around the tire but extends only from one base flange around to the other and is of greatest thickness midway between these two flanges, that is, at the tread of the tire.

Reference is to be had to the accompanying drawing, forming a part of this specification, in which the figure shows a transverse section through a tire constructed in accordance with our invention.

The body of the tire may be made in any well-known manner, but preferably includes an inner layer 10, of rubber impervious to air and which serves to receive the latter under pressure. On the outside of this inner tube or inner layer there is disposed a layer of our improved composition 11, which is of an adhesive character and of a semi-liquid or plastic consistency. The composition is preferably formed of glue, molasses, cotton, tar, vinegar and pure rubber gum. The layer of our improved composition is of variable thickness, the greatest thickness being at the tread of the tire. The composition is held in place between the inner tube 10 and a second rubber tube 12, which may be formed integral with the inner tube 10 along the inner periphery of the tire and between the base flanges. Encircling the tube 12 is a layer of strong fiber 13, for instance, cotton, and this layer is connected to the base flanges 14, which latter may engage with the flanges of a clencher rim 15. On the outside of this fiber layer, there is preferably provided a thickened tread 16 of rubber, which may, if desired, include a series of strips 17, of cotton or other strong fiber.

As will be noted, the composition is adjacent the innermost tube or layer of the tire, so that any small cuts or abrasions in the outer casing will not affect the composition. In case the entire wall of the tube is punctured, the air escaping from the inner tube 10 will force a portion of the composition into the aperture in the tube 12 and close the opening in the latter, so that no more air can escape. The composition will then enter the opening in the inner tube 10 and effectively close the opening therein. As the tube 12 is normally impervious to the passage of air, the inner tube 10 may contain any number of openings without impairing the efficiency of the tire. In fact, the inner tube 10 may serve merely to retain the composition adjacent the inner surface of the tube 12, so that it will be in position to enter and close any openings in the latter.

Having thus described our invention, we claim as new and desire to secure by Letters Patent:

A composition for use in closing apertures in vehicle tires, including glue, molasses, cotton, tar, vinegar and gum rubber.

In testimony whereof we have signed our names to this specification in the presence of two subscribing witnesses.

WILLIAM W. McCORD.
          GEORGE F. CLARK.
          PRESLEY M. HALL.

Witnesses:
  L. FRANK BROWN,
  W. M. ELLIOTT.